United States Patent
Baron et al.

(10) Patent No.: US 8,132,111 B2
(45) Date of Patent: Mar. 6, 2012

(54) VIRTUAL SOCIAL INTERACTIONS

(76) Inventors: Samuel Pierce Baron, Santa Cruz, CA (US); Itzik George Cohen, Santa Cruz, CA (US)

(*) Notice: Subject to any disclaimer, the term of this patent is extended or adjusted under 35 U.S.C. 154(b) by 711 days.

(21) Appl. No.: 12/011,350

(22) Filed: Jan. 25, 2008

(65) Prior Publication Data

US 2008/0195956 A1 Aug. 14, 2008

Related U.S. Application Data

(60) Provisional application No. 60/886,600, filed on Jan. 25, 2007.

(51) Int. Cl.
G06F 3/14 (2006.01)
G06F 3/17 (2006.01)

(52) U.S. Cl. ........ 715/753; 715/744; 715/745; 715/751; 715/752; 703/6; 705/27; 707/740; 725/112

(58) Field of Classification Search .......... 715/200–277, 715/700–867; 700/701–866; 709/201–229; 705/50–79; 345/30–111; 707/1–10, 100–104.1, 707/200–206; 703/6; 725/112
See application file for complete search history.

(56) References Cited

U.S. PATENT DOCUMENTS

| 6,829,569 | B1* | 12/2004 | Drucker et al. | 703/6 |
|---|---|---|---|---|
| 7,013,290 | B2* | 3/2006 | Ananian | 705/27 |
| 7,614,001 | B2* | 11/2009 | Abbott et al. | 715/744 |
| 2004/0031058 | A1* | 2/2004 | Reisman | 725/112 |
| 2010/0205179 | A1* | 8/2010 | Carson et al. | 707/740 |

* cited by examiner

*Primary Examiner* — Ruay Ho
(74) *Attorney, Agent, or Firm* — Ash Tankha; Lipton, Weinberger & Husick

(57) ABSTRACT

A computer implemented method and system for enabling an interaction between a first user and a second user in a virtual social environment is disclosed. A plurality of interactables is provided in the virtual social environment for enabling a first user and a second user to interact in the virtual social environment. The first user selects one or more of the interactables and may modify the selected interactables. The first user targets the modified interactables to the second user in the virtual social environment. The first user renders the targeted interactables to the second user in the virtual social environment. Further, the first user shares the targeted interactables with the second user in the virtual social environment.

22 Claims, 16 Drawing Sheets

VIRTUAL SOCIAL INTERACTIONS

CROSS REFERENCE TO RELATED APPLICATIONS

This application claims the benefit of provisional patent application number U.S. 60/886,600, titled "A method and system for context sensitive, synchronized group audio and visual interactions in social environments comprised of one or more social contexts", filed on Jan. 25, 2007 in the United States Patent and Trademark Office.

BACKGROUND

This invention generally relates to online user interaction. More particularly, this invention relates to enabling users to interact in a virtual social environment.

Typically, internet users interact with each other through electronic mail, chat applications, or discussion forums. The interaction may include exchange of information in text format, audio format, video format, or a combination of any one of the formats. The internet users may desire to convey a message or add a gesture along with the exchange of the information. For example, an internet user may desire to share a video clip of an event with the user's family members. The user may desire to watch the video clip simultaneously with the family members even though the user and the family members are in different geographical locations. Moreover, the user and the family members may want to add comments, convey messages to each other, or add gestures or comments along with the video being watched.

Hence, there is a need for a method and system to provide a virtual social environment for users to conduct social interactions virtually, where users are provided means to convey thoughts, ideas, or emotions, typical of a human interaction.

SUMMARY OF THE INVENTION

The computer implemented method and system disclosed herein, addresses the above stated need for providing a virtual social environment for users to conduct social interactions virtually, where users are provided means to convey thoughts, ideas, or emotions, typical of a human interaction.

The method and system disclosed herein provides a plurality of interactables in a virtual social environment for enabling a first user and a second user to interact in the virtual social environment. The interactables may include animations, text, sound, video, or actions directed at sensory modalities such as smell or touch. The method disclosed herein is not limited to interaction between the first user and the second user, but also enables interaction between a plurality of users. The first user selects one or more of the interactables. The first user and the virtual social environment may modify the selected interactables. Modifying the selected interactables includes customizing object attributes of the selected interactables. The object attributes may include audio, visual, or textual attributes. The first user interacts with the second user in the virtual social environment. The interaction of the first user and the second user includes online activities including gaming, chatting, discussions, social networking, meetings, blogging, and sharing of content. The content may be graphical images, videos, slideshows, or audio content.

The first user targets the modified interactables to the second user, the virtual social environment, or a combination thereof. The step of targeting is based on the context of the virtual social environment, behaviors of the first user and the second user, time and schedule of user interactions, and predefined levels of permissions in the virtual social environment. The first user renders the targeted interactables to the second user, the virtual social environment, or a combination thereof. Further, the first user shares the targeted interactables with the second user in the virtual social environment.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
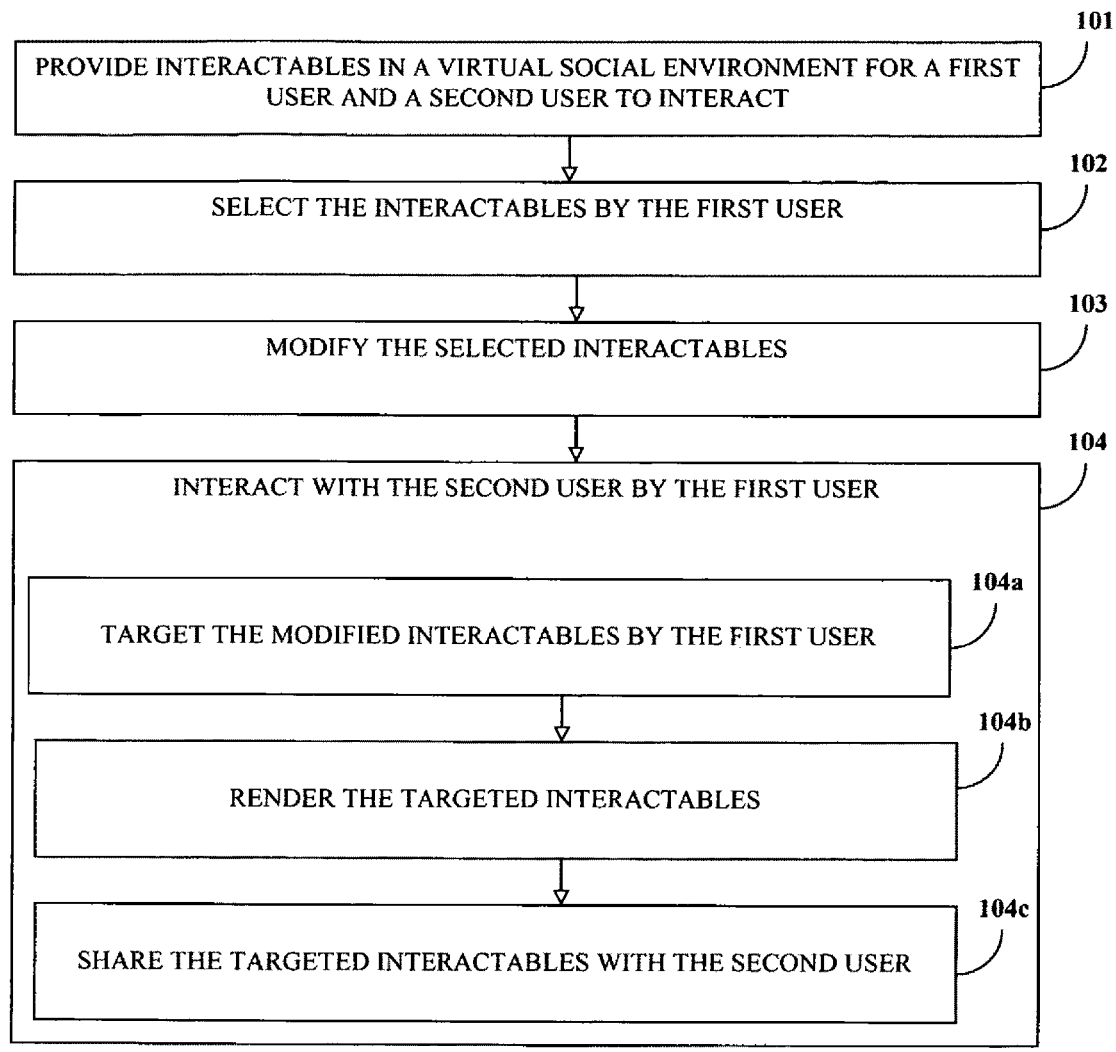
FIG. 1 illustrates a computer implemented method of enabling a first user and a second user to interact in a virtual social environment.

FIG. 1 illustrates a computer implemented method of enabling a first user and a second user to interact in a virtual social environment. The method disclosed herein provides 101 a plurality of interactables in a virtual social environment for enabling a first user and a second user to interact in the virtual social environment. The method disclosed herein is not limited to interaction between the first user and the second user, but also enables interaction between a plurality of users. The virtual social environment is a context including one or more ways for individuals to interact with each other and share experiences. The virtual social environment comprise chat rooms, instant messaging, private messaging, synchronous video watching, audio and video playlist sharing, slideshow sharing, etc.

Figure 9A:
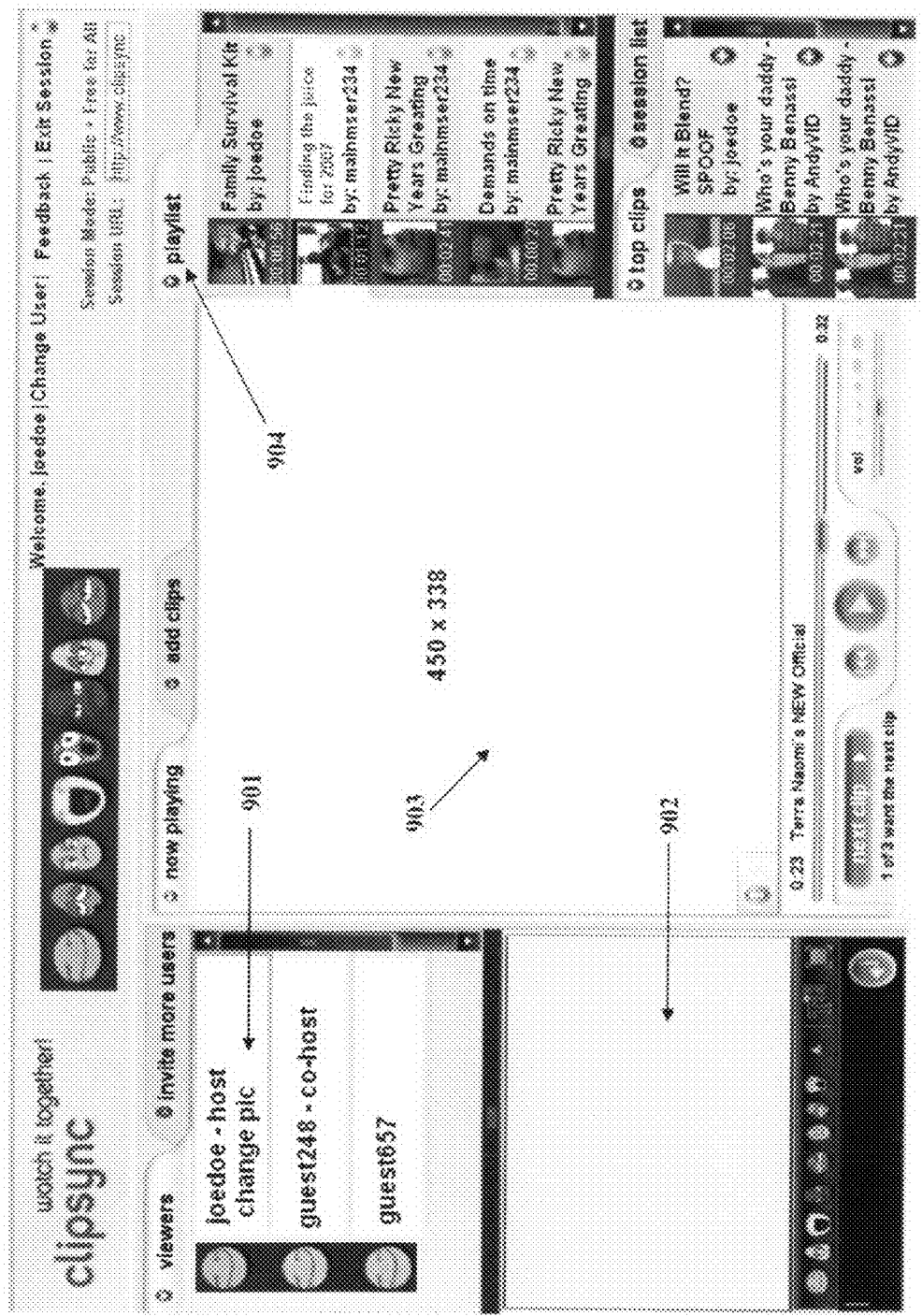
FIG. 9A exemplarily illustrates a virtual social environment.
Figure 9B:
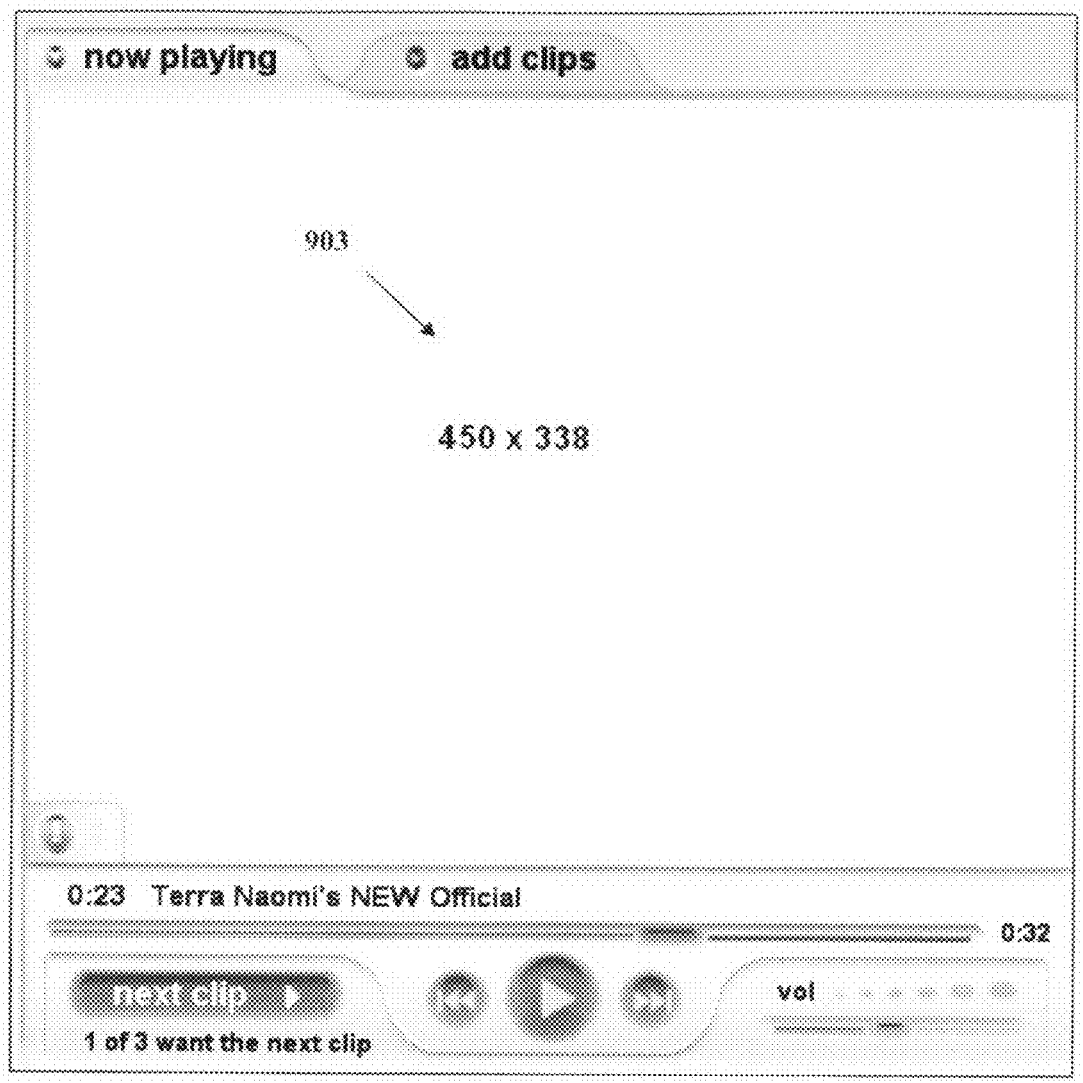
FIG. 9B exemplarily illustrates a video area for displaying videos to participants in the virtual social environment.

The virtual social environment is exemplarily illustrated in FIG. 9A. The virtual social environment includes a list 901 of participants or viewers in the virtual social environment, a chat area 902 for communication, a shared video viewing area 903 that all participants can see, and a list 904 of videos or video clips that are shared in the virtual social environment. The video viewing area 903 is illustrated in FIG. 9B. Videos may be added to the "watch list" or "play list", where any number of video clips may be queued for viewing by a group of participants.

The interactables may include animations, text, sound, video, or actions directed at sensory modalities, such as smell or touch. The interactable may be an object with properties designed for use in virtual social environment to allow users to interact with their environments or with each other. The interactables may have properties including but not limited to size, shape, appearance, design, permissions, actions, states, scripting, timing, etc. The interactables also include descriptive information or meta data information which includes, but is not limited to creation date, most used, interactable rating, name, creator, brand, brand family, etc. The interactable may affect the entire virtual social environment or portions of the virtual social environment, where the scope of an interactable's effect is influenced or limited by the users participating in the virtual social environment, time, schedule, and context of the virtual social environment. The context of the virtual social environment may comprise other interactables, behaviors of users, components of the virtual social environment, associated permissions for the users, etc.

The first user selects 102 one or more of the interactables. The first user selects the interactables from an interactables library in the virtual social environment. The selected interactables are highlighted as illustrated in FIG. 9D. The interactables may be highlighted to indicate that an interactable is selected upon a key stroke or a mouse action. The first user modifies 103 selected interactables. Modifying the selected interactables include customizing object attributes of the selected interactables. The object attributes may include audio, visual, or textual attributes. The object attributes are customized based on social gestures to be conveyed to the second user, the virtual social environment, or a combination thereof. Further, modifying the selected interactables may be performed by one of the first user, the virtual social environment, or a combination thereof, based on context in the virtual social environment. The context is determined by user interactions in the virtual social environment.

The first user interacts 104 with the second user in the virtual social environment. The interaction of the first user and the second user comprise online activities including gaming, chatting, discussions, social networking, meetings, blogging, sharing of content, etc. The content may be graphical images, videos, slideshows, or audio content. The first user targets 104a the modified interactables to the second user, the virtual social environment, or a combination thereof. Targeting refers to the act of pointing and clicking a mouse or other input device for the purpose of determining where an interactable will appear or stop if the interactable follows an animated path. Further, targeting may also include selecting or creating a path for the interactable to follow before hitting a target location. Targeting is subject to context parameters in the virtual social environment in which the interactables are placed and subject to the properties of the interactables themselves.

The step of targeting is based on context of the virtual social environment, behaviors of the first user and the second user, time and schedule of the user interactions, and predefined levels of permissions in the virtual social environment. The first user renders 104b the targeted interactables to the second user, the virtual social environment, or a combination thereof. The first user renders the interactables on acquiring permission from the second user. Further, the first user shares 104c the targeted interactables with the second user in the virtual social environment. The first user may create the interactables in the virtual social environment. The method disclosed herein tracks and captures interactables usage information of the first user and the second user.

Figure 2:
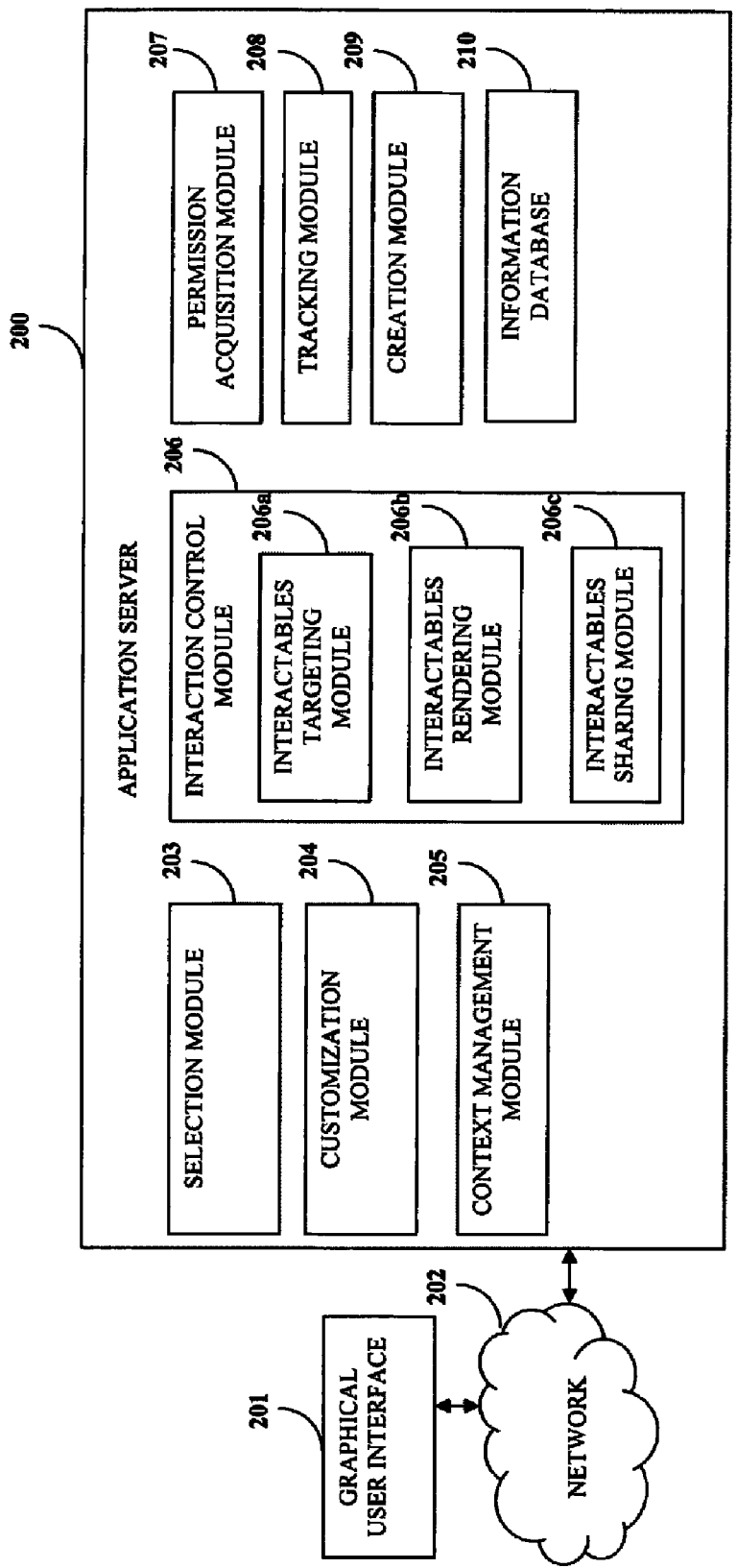
FIG. 2 illustrates a computer implemented system for enabling a first user and a second user to interact in a virtual social environment.

FIG. 2 illustrates a computer implemented system for enabling a first user and a second user to interact in a virtual social environment. The system disclosed herein comprises a graphical user interface (GUI) 201 and an application server 200. The application server 200 hosts the virtual social environment. The application server 200 comprises a selection module 203, a customization module 204, an interaction control module 206, a context management module 205, a permission acquisition module 207, a tracking module 208, a creation module 209, and an information database 210.

The GUI 201 enables the first user and the second user to access the virtual social environment via a network 202. The selection module 203 selects multiple interactables provided in the virtual social environment. The customization module 204 modifies selected interactables by customizing object attributes of the selected interactables. The interaction control module 206 enables interaction of the first user and the second user in the virtual social environment. The interaction control module 206 comprises an interactables targeting module 206a, an interactables rendering module 206b, and an interactables sharing module 206c. The interactables targeting module 206a targets the selected interactables of the first user to one or more of the second user, the virtual social environment, and a combination thereof.

The targeting is based on one or more of the context of the virtual social environment, behaviors of the first user and the second user, the time and schedule of user interactions, or the predefined levels of permissions in the virtual social environment. The interactables rendering module 206b renders targeted interactables to the second user, the virtual social environment, or a combination thereof. The interactables sharing module 206c shares the targeted interactables with the second user in the virtual social environment. The second user may view the targeted interactables based on the permission granted by the first user or by the virtual social environment.

The context management module 205 determines the context in the virtual social environment. The permission acquisition module 207 acquires permission for rendering the interactables. The tracking module 208 tracks and captures interactables usage information in the virtual social environment. The creation module 209 creates the interactables by the first user in the virtual social environment. The information database 210 stores the interactables. The information database 210 also stores information of the first user and the second user, and the information of a plurality of participants of the virtual social environment.

Figure 3:
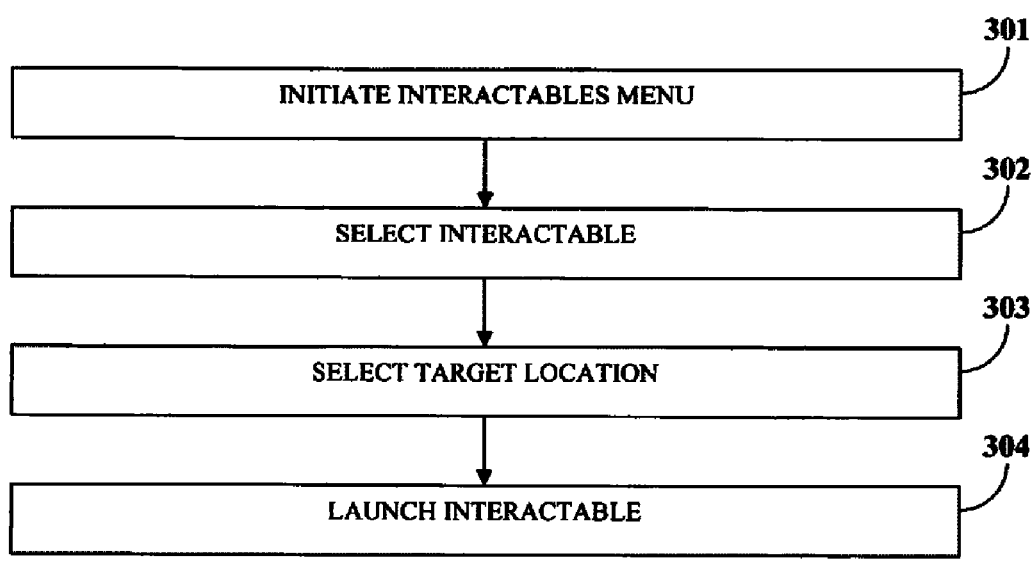
FIG. 3 exemplarily illustrates the operational flow of "interactables".

FIG. 3 exemplarily illustrates the operational flow of "interactables". A first user initiates 301 an interactables menu. The first user selects 302 an interactable in a virtual social environment. The first user selects 303 a target location in the virtual social environment for placing the interactable. Further, the first user launches 304 the interactable into the virtual social environment.

Figure 4:
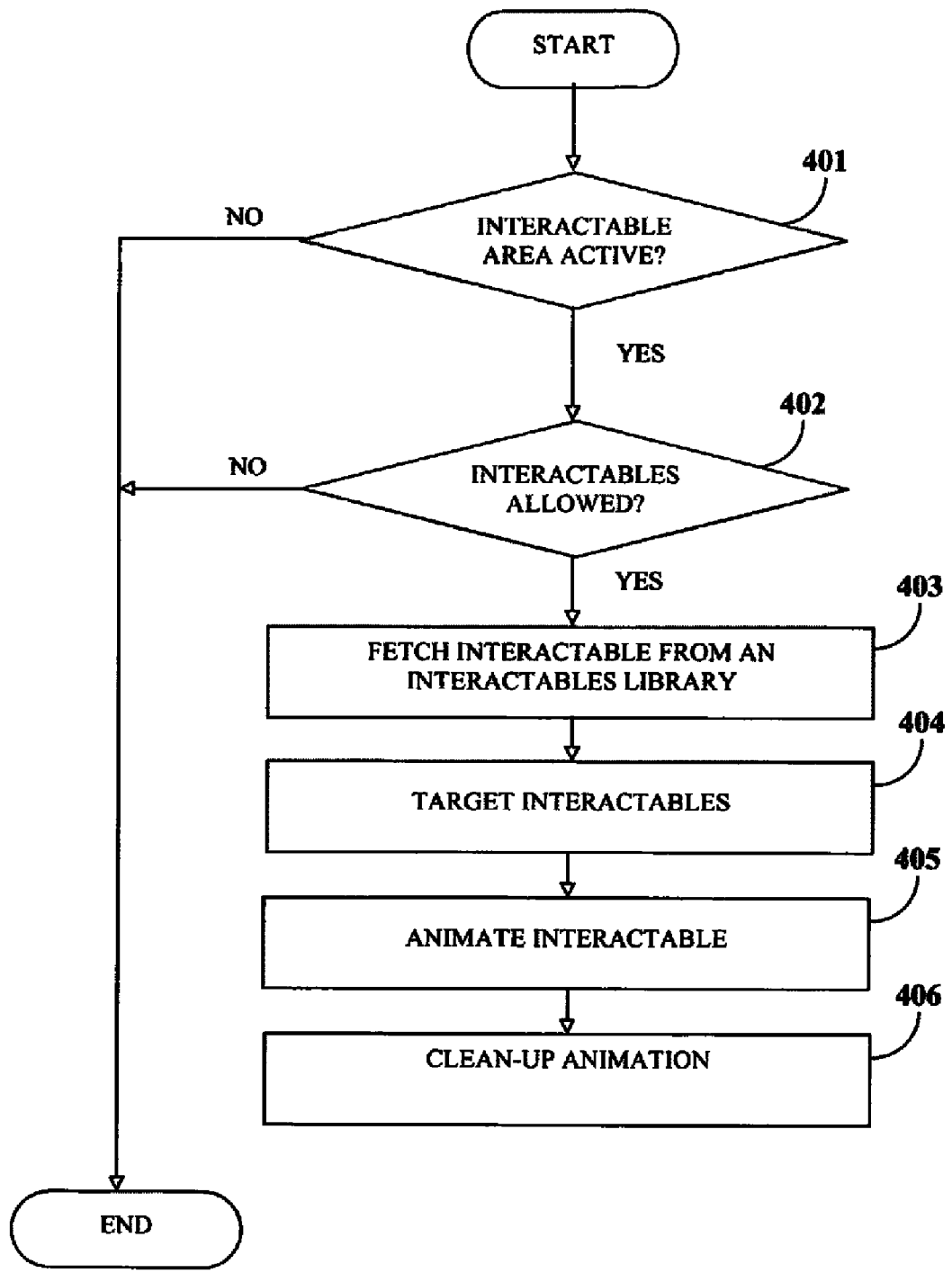
FIG. 4 exemplarily illustrates the interaction flow of "interactables".

FIG. 4 exemplarily illustrates the interaction flow of "interactables". A virtual social environment is provided for a first user to render interactables to a second user. The interactables allow the first user and the second user to interact with each other. The virtual social environment detects an action performed by the first user. The action performed by the first user activates the interactables. The action includes one or more of mouse over, left mouse click action, right mouse click action, etc. An area in the virtual social environment may be used by the first user for targeting the interactables. The actual size of the area may be arbitrarily set using configuration files or meta data, or the area may depend on local contexts in the virtual social environment including, but not limited to, areas such as video playback, user list, chat, or play lists.

A context management module 205 in the virtual social environment checks 402 whether the area is in an active state 401. If the area is in the active state, then the virtual social environment may allow the interactables in the active area. The interactables may be allowed or disallowed based on the social context, users, moderation, or a combination thereof. Users may be actively or passively disallowed from using interactables due to active moderation, reputation or lack of reputation, probation, or other user conditions or roles. The interactables may be allowed or disallowed based on the context of the social activity, media clip such as audio, video, slideshow, etc., absolute or relative location of the desired interactable on a web page, absolute or relative time, schedule of the session, or time period when the interactable is introduced.

The context management module 205 fetches 403 the interactables in the virtual social environment if the context management module 205 allows the interactables. In an embodiment of the invention, the context management module 205 may fetch the minimum default interactables which may include, but are not limited to animals, emoticons, fruits, vegetables, weapons, etc. In another embodiment of the invention, interactables may come from an interactable library, where any number of interactables may be made available for a virtual social environment, subject to contextual constraints. The interactables may be stored in an information database 210.

An interactables targeting module 206a targets 404 the interactables in the virtual social environment after the interactables are selected. The interactable selected enters a targeting or "aiming state". The mouse pointer over the virtual social environment animates 405 the interactables and are displayed as crosshairs to indicate a targeting state of the interactables. The mouse pointer returns if the user moves the mouse over a non targetable area. Further, the crosshairs return as soon as a targetable area is re-entered with the mouse. The "aiming state" or "armed state" of the interactables is illustrated in FIG. 9E. The interactable is highlighted in a menu, and the mouse or other input device pointer is shown as a crosshair on a video area 903. The crosshair represents the targeting action in the virtual social environment. The interactable is not visible to any participants in the virtual social environment except for the user who initiated the interactable selection and targeting.

In an embodiment of the invention, the interactables may appear after an initial "whoosh" sound and then appear in the virtual social environment. In another embodiment of the invention, the interactable may follow a path on the screen from a selected or random starting point to the target location while accompanied by sounds. Upon reaching the target, the interactable may initiate another sound to indicate reaching of the target and also change its visual appearance, including but not limited to analogous behavior to throwing items at a theater stage or TV.

Figure 9C:
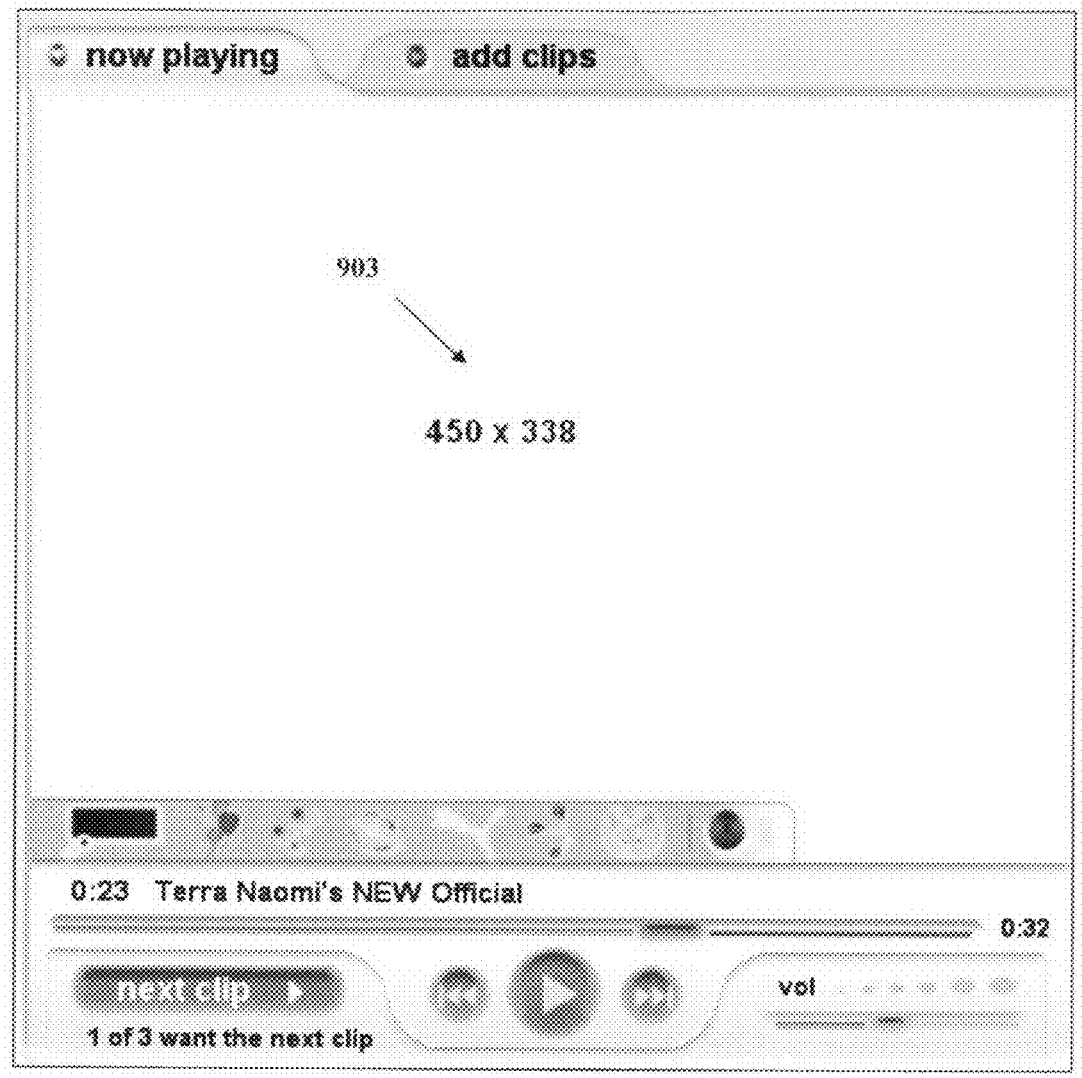
FIG. 9C exemplarily illustrates a video area after an action is performed to initiate an interactables menu in the virtual social environment.
Figure 9D:
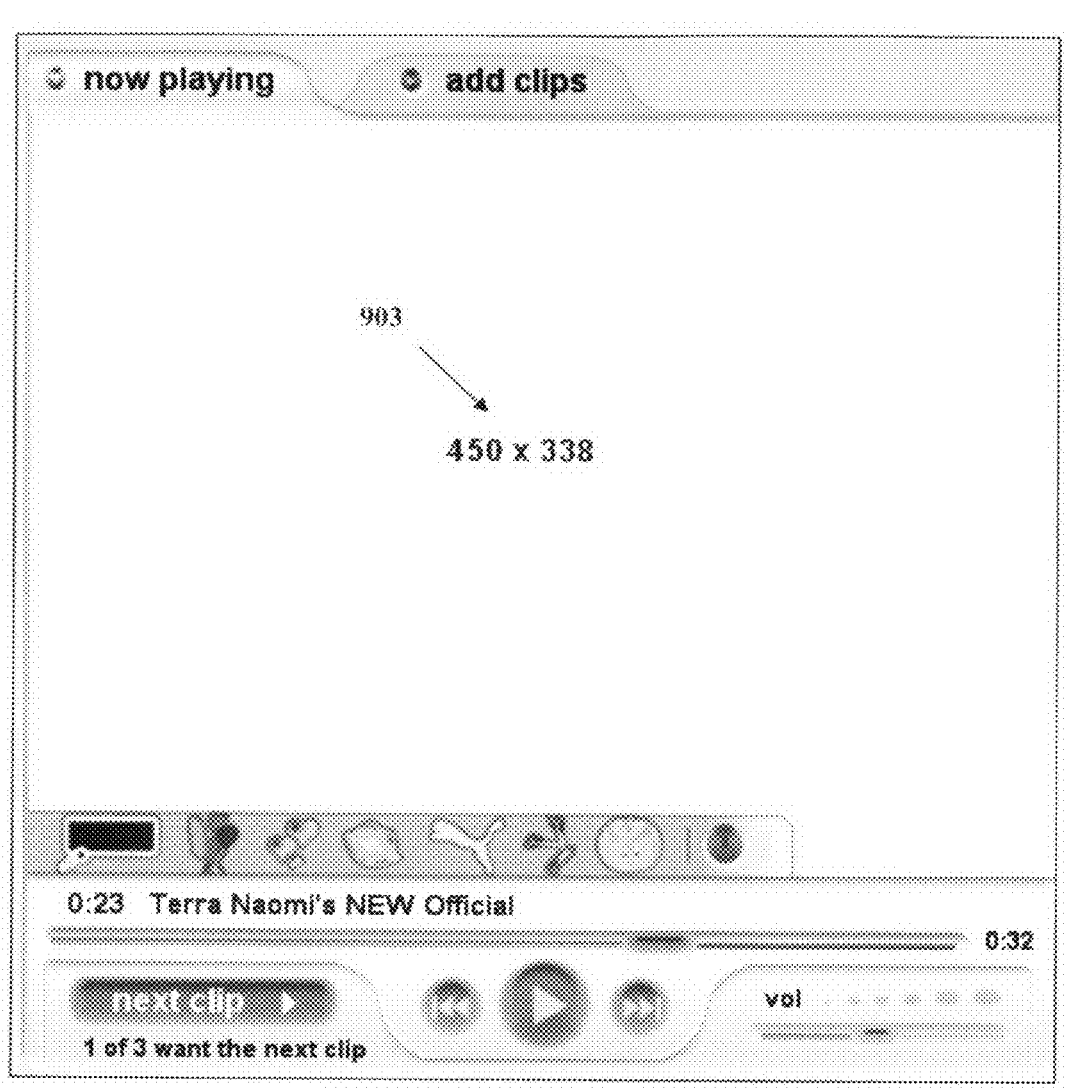
FIG. 9D exemplarily illustrates "interactables" in a highlighted or "selectable" representation.
Figure 9E:
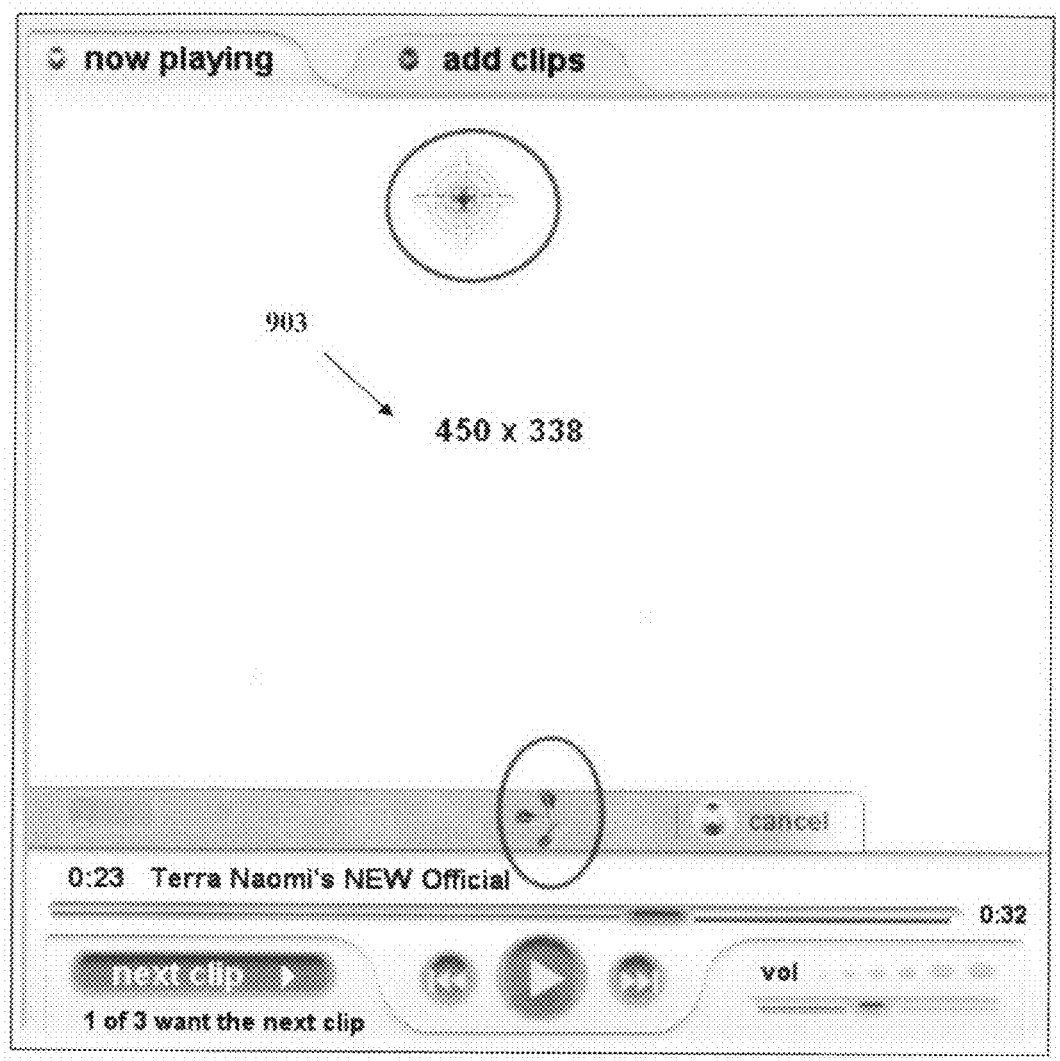
FIG. 9E exemplarily illustrates an example of an "interactable" in a selected and "armed" state.
Figure 9F:
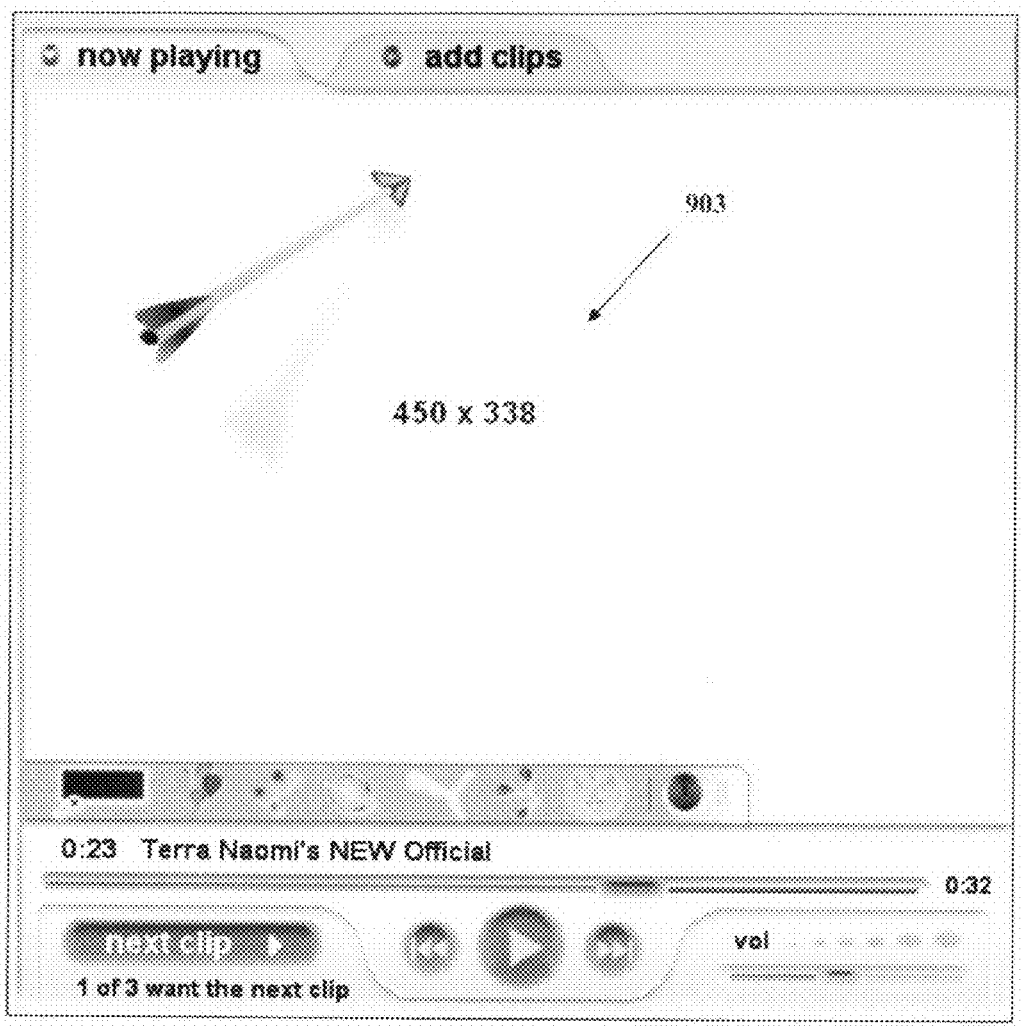
FIG. 9F exemplarily illustrates an "interactable" placed or "delivered" onto the video area.
Figure 9G:
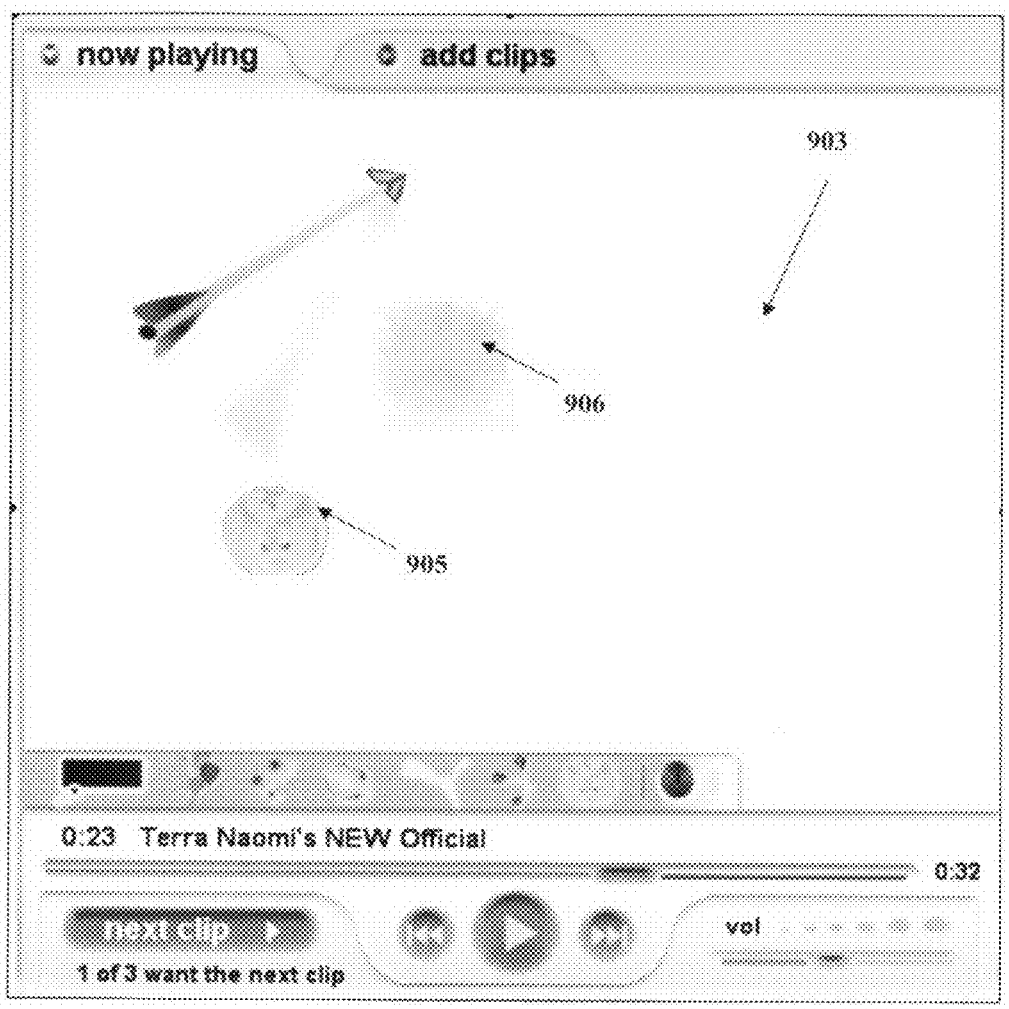
FIG. 9G exemplarily illustrates multiple "interactables" delivered onto the video area of a virtual social environment.

The impact of an interactable represented as a tomato, which changes state from a whole tomato to a splattered tomato after impact is illustrated in FIG. 9G. After the interactable has been delivered and reached its target, the interactable enters a clean-up 406 phase. Based on properties of the interactable, the interactable may take several actions including but not limited to fade out, move, change, request interaction with users, etc. In an embodiment of the invention, the interactable will fade out after reaching its target, disappearing after a global time-out parameter for all the interactables. In another embodiment of the invention, the interactable may engage in actions including but not limited to exploding after a time period, interact with the user by avoiding the user's mouse, offering coupons or discounts upon a click action, allowing users to save or keep the interactable for later use, etc.

Figure 5:
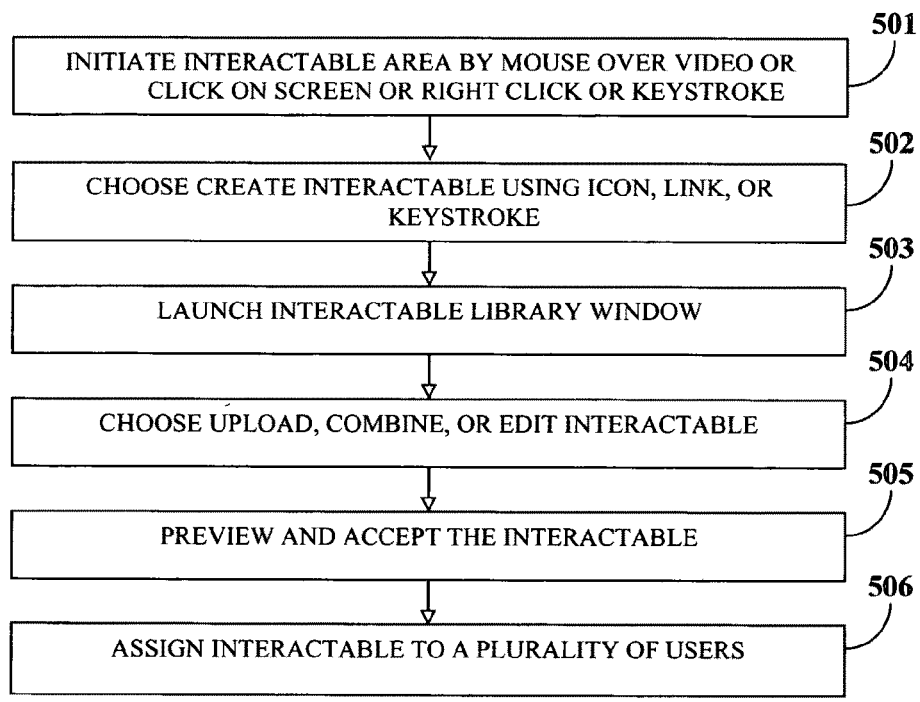
FIG. 5 exemplarily illustrates the steps involved in creating "interactables".

FIG. 5 exemplarily illustrates the steps involved in creating "interactables". The interactables may be created or may be preexisting in the virtual social environment. A first user utilizes a computer input device, for example, a mouse, a keyboard, etc. to initiate 501 the interactables on an interactable area in the virtual social environment. The creation of the interactables, is described herein as launching from an active session, however it may also occur from other contexts, comprising local user profile management, system administration, etc. Creation outside of an active virtual social environment will attempt to place new interactables in the creator's "hotlist", or personal library of interactables.

The first user chooses 502 to create the interactables using an icon, link, or keystroke in the virtual social environment. The first user launches 503 an interactables window upon a keystroke or movement of the computer mouse in the virtual social environment. The first user may combine 504 the interactables, edit the interactables, or choose to upload the interactables in the virtual social environment. The upload of the interactables may be through an administration system or through a standard upload dialog box. The format of the interactables includes standard image formats or standard animation formats supported by internet browsers and online applications including but not limited to joint photographic experts group (jpeg) format, graphics interchange format (gif), bitmap (bmp) format, animated gif format, tagged image file format (tiff) format, encapsulated postscript (eps) format, flash format, scalable vector graphics (svg) format, shockwave, etc.

The combinations of the interactables may be created using a "what you see is what you get" (WYSIWYG) drag and drop interface, where x, y, and z coordinates of the interactables which are not first in the combination are stored relative to the interactables which are first in the combination. The "z" index information is used to allow relative appearance of interactables in a combination or package, to enable ordered unbundling access to individual interactables, and determine animation effects for pre and post-target delivery of interactables onto the virtual social environment. Subscriptions represent real-time or asynchronous feeds that may be set up for a user or virtual social environment, where interactables may be delivered or imported to a user's "hotlist" or virtual social environment's default interactables list. Subscriptions must be created at the user creation or the virtual social environment creation, or in the user or the virtual social environment editing phases, as the new interactables will be subject to permissions, reputation, and context.

The first user may preview 505 the created interactables and may update the meta data. Further, the created or updated interactables are stored in the information database 210. Further, the first user may target and assign 506 the interactables to one or more of a plurality of users in the virtual social environment. New interactables may be created by one or more of combining interactables into a permanent new combined interactable, grouping interactables into a package comprised of other interactables which are separate from each other, by editing any number of descriptive attributes of existing interactables, by an upload and configuration process, or by subscribing to a feed or library of interactables. Some of the creation mechanisms, especially subscriptions, may require payment of some currency. The newly created interactable is added to a user's interactable "hotlist", to other users' "hotlists", to the current virtual social environment, or made available globally to all virtual social environments. The permissions, context, and reputations of the users and sessions may prevent assignment of the interactables and may generate an error message in the virtual social environment.

Figure 6:
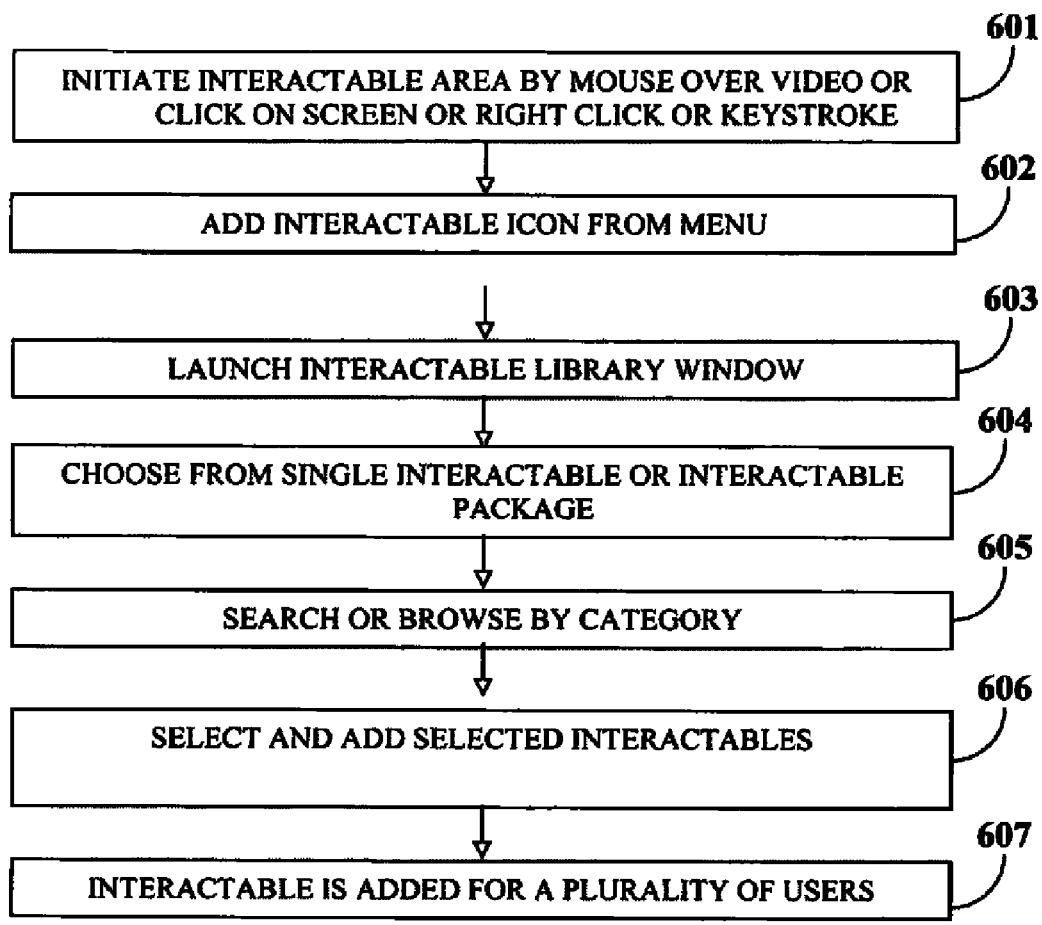
FIG. 6 exemplarily illustrates the steps involved in adding "interactables".

FIG. 6 exemplarily illustrates the steps involved in adding "interactables". A first user utilizes a computer input device, for example, a mouse, a keyboard, etc. to initiate 601 the interactables on an interactable area in the virtual social environment. The first user adds 602 existing interactables from an interactables menu to an online session or predetermined user list. Further, the first user launches 603 an interactable library window. The first user chooses 604 the interactables from a single interactable or an interactable package. The first user may search 605 for the interactables in the virtual social environment. The first user may perform a meta data search comprising creation date, most used, interactable rating, name, creator, brand, brand family, etc. The search is based on the meta data for the interactables in single or combined form. An embodiment allows interactables to be sourced, searched, and added from other locations, including local files systems and third party online locations. The first user may select 606 the interactables and may add the interactables to a personal interactable library. Further, the first user may add 607 the interactables for a plurality of users.

Figure 7:
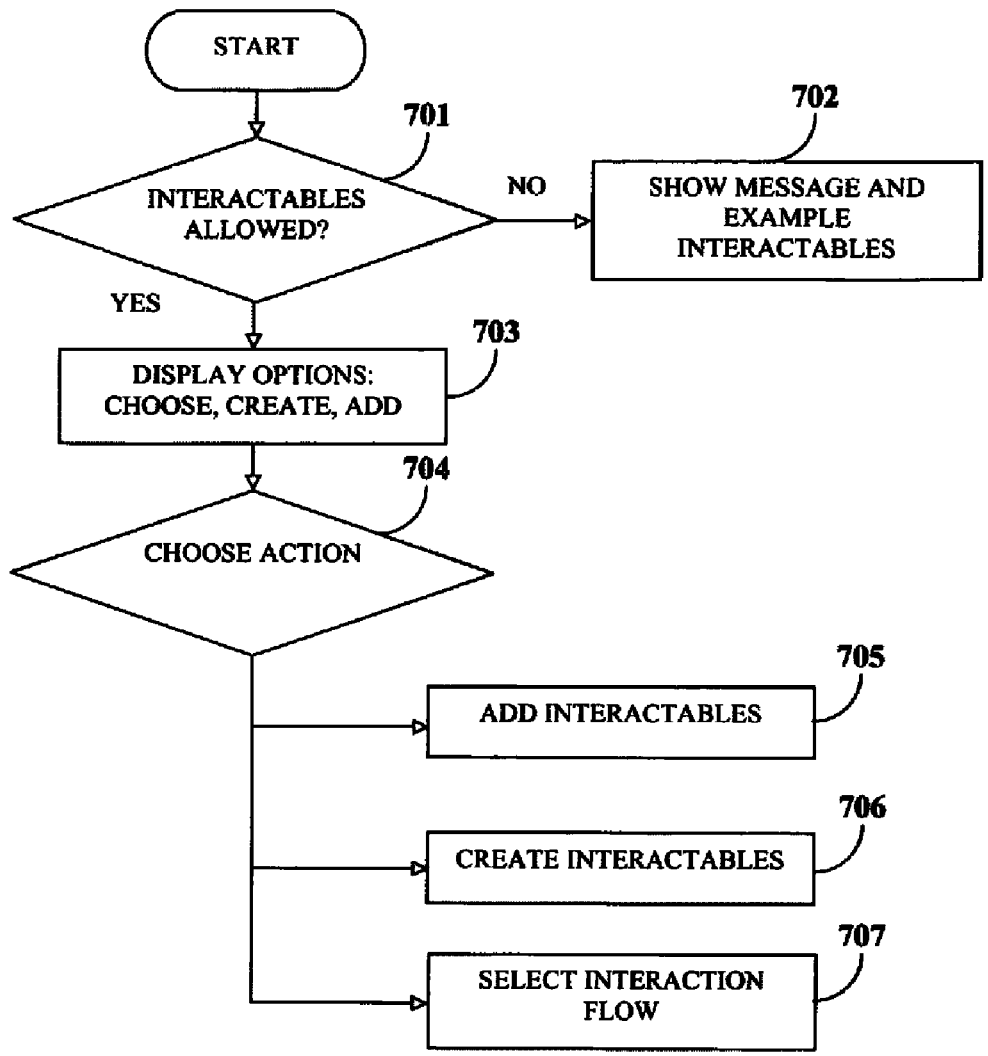
FIG. 7 exemplarily illustrates the decision flow for initiating "interactable" related activities.

FIG. 7 exemplarily illustrates the decision flow for initiating "interactable" related activities. The first user initiates the interactables by one of placing a mouse pointer over a virtual social environment or through a key stroke. The context management module 205 checks 701 whether the virtual social environment allows the interactables. If the interactables are allowed, then the allowed interactables are displayed 703 in the virtual social environment. The displayed interactables are exemplarily shown in FIG. 9C. If the interactables are not allowed, a warning message is displayed 702 to the first user. The first user may choose 704 actions including creating 706 the interactables, adding the interactables 705, and selecting 707 the interactables.

Figure 8:
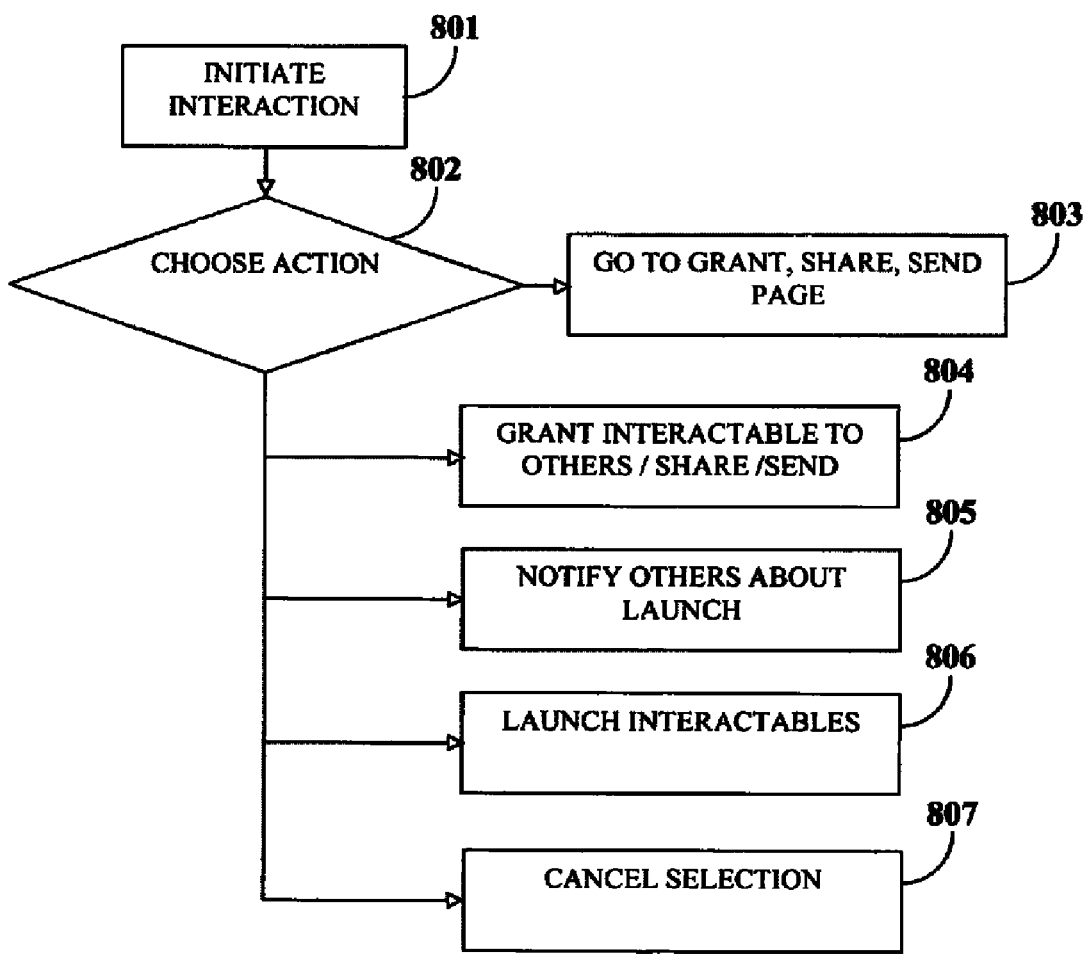
FIG. 8 exemplarily illustrates the post selection interaction flow after selection of an interactable.

FIG. 8 exemplarily illustrates the post selection interaction flow after selection of an interactable. A first user initiates 801 interactions with a second user. An interactable is selected by a first user, allowing the first user making the selection, to choose 802 a course of action. The first user may be directed 803 to grant, share, and send webpage. The actions include but are not limited to granting 804, sharing, or sending the interactable, notifying 805 the users or the virtual social environment of launching a selected interactable, launching 806 the interactable, or canceling 807 the interactable selection. Granting permission includes giving an interactable to a second user by the first user by transferring ownership of the interactable to the second user. Sharing includes sharing an interactable between the first user and the second user. Sending the interactable includes sending an interactable by the first user to one or more of the second user, the virtual social environment, or a combination thereof.

Grant, share, and send (GSS) actions are by default free, however, based on the permissions and context for interactables and virtual social environment, the users may be charged. For example, if an interactable is "premium", it may require payment via points, credits, money, or other currency supported in the virtual social environment. A licensed or scarce interactable may require payment to use once, a predetermined number of times or during a specific time period or time range. A GSS action can also be specified as temporal for use during current session in the virtual social environment or non temporal, where the GSS action results in longer term use and availability of an interactable for users. The users may include the first user or the second user. The step of notification includes sending messages in a chat window, sending messages in any area of the virtual social environment, color changes of users or their representations in the virtual social environment, visual cues such as bubbles, bubbles with text, custom or system sounds.

FIG. 9C exemplarily illustrates a video area 903 after an action is performed to initiate an interactables menu in the virtual social environment. The action includes one or more of a mouse over action over a symbol or an icon, a key stroke combination, or an action which causes a menu to appear in the virtual social environment. The menu may include the interactables in text or graphical representation. The interactables may be represented as graphical icons depicted exemplarily as tomatoes, animals, weapons, emoticons, symbols, toys, gifts, video games, video game components, etc.

FIG. 9F exemplarily illustrates an "interactable" placed or "delivered" onto the video area 903. The interactable becomes visible to all participants in the virtual social environment, if the participants are provided permission to view the interactables. The interactables menu further allows additional selection of one or more of the interactables for continued interaction with the participants and the video area 903.

FIG. 9G exemplarily illustrates multiple "interactables" delivered onto the video area 903 of a virtual social environment. One or more interactables may be placed or "launched" onto the video area 903. Each interactable may remain permanently or fade out after a specified amount of time. A second interactable 906 may be delivered that is different from the first interactable 905, as any number of the same or different interactables may be delivered into the virtual social environment or the video area 903. The interactable may appear or follow a visible path, change appearance based on the type of interactable or properties of the interactables. The second interactable 906 appears in a splattered or end state as a result of the delivery of the first interactable 905.

In the example illustrated in FIG. 9G, the tomato interactable 905 was thrown on the video area 903 and became a splattered tomato interactable 906. For visual effects, the path or display of the interactable over time may appear on the video area 903 as moving from one point to another in addition to displaying animation effects of the interactable. The movement from one point to another provides the appearance of flying of the interactable onto the video area 903 from user representation, name, or icon in a whole form or an animation state. Upon reaching the final location or delivery point, the interactable may take another state. In a lay person's view, the interactable could appear to have been thrown from a user onto a video area 903 and shattering, splattering, or sticking on the video area 903.

Figure 9H:
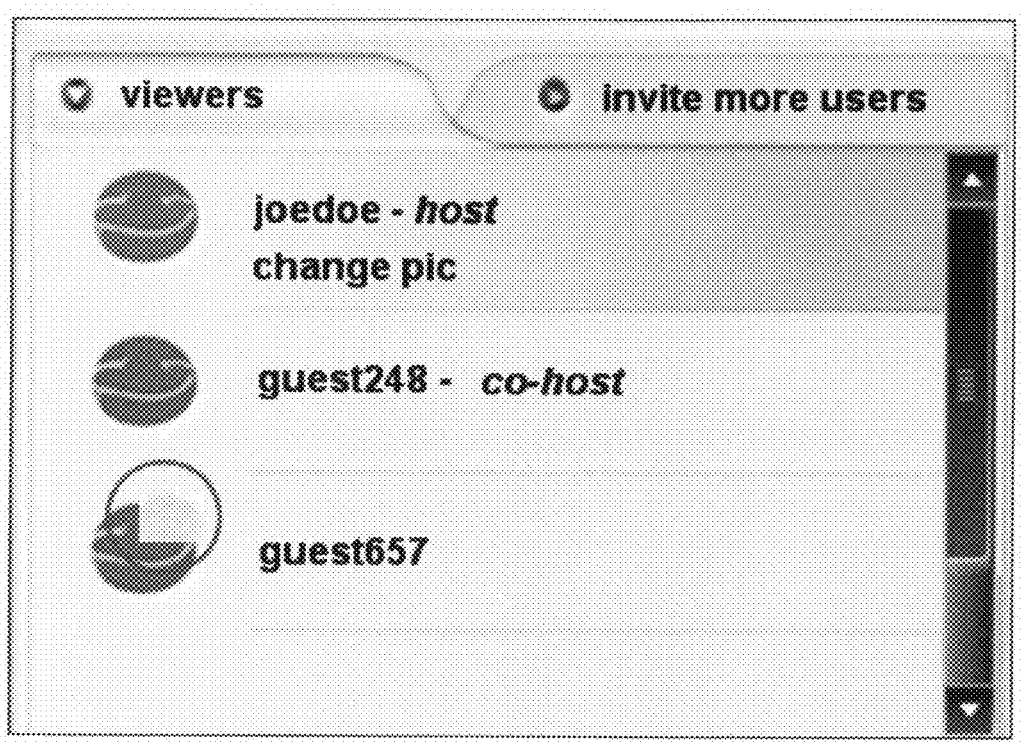
FIG. 9H exemplarily illustrates an embodiment of the virtual social environment.

FIG. 9H exemplarily illustrates an embodiment of the virtual social environment. In the embodiment, an interactable may be delivered onto a participant's representation, icon, symbol, or name in the virtual social environment. The interactable may partially or wholly cover the participant's representation according to the properties of the interactable and the properties, permissions, and reputation of the participant.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A 'processor' means any one or more microprocessors, Central Processing Unit (CPU) devices, computing devices, microcontrollers, digital signal processors or like devices. The term 'computer-readable medium' refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

Where databases are described such as the information database 210, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, UltraSPARC® processors, etc. that are adapted to communicate with the computer. Any number and type of machines may be in communication with the computer.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A computer implemented method of enabling a first user and a second user to interact in a virtual social environment, comprising:

provding a plurality of interactables in said virtual social environment for enabling said first user and said second user to interact in the virtual social environment, wherein said interactables comprises animations, text, sound, videos, and actions directed at one or more of sensory modalities including smell and touch;

selecting one or more of the interactables by the first user;

modifying said selected interactables by customizing object attributes of the selected interactables, wherein said object attributes include audio, visual, and textual attributes associated with the interactables;

interacting with the second user by the first user in the virtual social environment, comprising the steps of:

targeting said modified interactables by the first user to one of the second user and/or the virtual social environment, and a combination thereof, wherein said step of targeting is based on one or more of context of the virtual social environment, behaviors of the first user and the second user, time and schedule of user interactions, and predefined levels of permissions in the virtual social environment, wherein said step of targeting further comprises;

defining relative appearance of said interactables and selecting or creating an animated path for each of said interactables, wherein said animated path and said relative appearance is defined using a plurality of coordinates;

rendering said targeted interactables to one of the second user and/or the virtual social environment, and a combination thereof; and sharing the targeted interactables with the second user in the virtual social environment;

whereby the virtual social environment enables the first user and the second user to interact using the interactables.

2. The computer implemented method of claim 1, wherein said interaction of the first user and the second user includes online activities comprising at least one of gaming, chatting, discussions, social networking, meetings, blogging, and sharing of content.

3. The computer implemented method of claim 2, wherein said content is one or more of graphical images, videos, slideshows, and audio content.

4. The computer implemented method of claim 1, wherein said step of modifying the selected interactables is performed by one of the first user and the virtual social environment based on context in the virtual social environment, wherein said context is determined by user interactions in the virtual social environment.

5. The computer implemented method of claim 1, wherein the object attributes are customized based on social gestures to be conveyed to one of the second user and/or the virtual social environment, and a combination thereof.

6. The computer implemented method of claim 1, further comprising a step of creating the interactables by the first user in the virtual social environment.

7. The computer implemented method of claim 1, wherein the first user selects the interactables from an interactables library in the virtual social environment.

8. The computer implemented method of claim 1, wherein the first user renders the interactables on acquiring permission from the second user.

9. The computer implemented method of claim 1, further comprising a step of tracking and capturing interactable usage information of the first user and the second user.

10. A computer implemented system for enabling a first user and a second user to interact in a virtual social environment, comprising:
an application server for hosting said virtual social environment, wherein said application server comprises:
a selection module for selecting one or more of a plurality of interactables provided in the virtual social environment;
a customization module for modifying said selected interactables by customizing object attributes of the selected interactables;
an interaction control module for enabling interaction of said first user and said second user in the virtual social environment, comprising:
an interactables targeting module for targeting the selected interactables of the first user to one or more of the second user, the virtual social environment, and a combination thereof, wherein said targeting is based on one or more of context of the virtual social environment, behaviors of the first user and the second user, time and schedule of user interactions, and predefined levels of permissions in the virtual social environment, wherein said interactables targeting module further defines relative appearance of said interactables and selects or creates an animated path for each of said interactables, and wherein said-animated path and said relative appearance is defined using a plurality of coordinates;
an interactables rendering module for rendering said targeted interactables to one of the second users and/or the virtual social environment; and
an interactables sharing module for sharing the targeted interactables with the second user in the virtual social environment.

11. The computer implemented system of claim 10, further comprising a context management module for determining said context in the virtual social environment.

12. The computer implemented system of claim 11, wherein said context management module in the virtual social environment defines an active state area for allowing or disallowing said interactables, wherein said interactables are allowed or disallowed based on social context, users, and moderation.

13. The computer implemented system of claim 10, further comprising a permission acquisition module for acquiring permission for rendering said interactables.

14. The computer implemented system of claim 10, further comprising a tracking module for tracking and capturing interactable usage information in the virtual social environment.

15. The computer implemented system of claim 10, further comprising a creation module for creating the interactables by the first user in the virtual social environment.

16. The computer implemented system of claim 10, further comprising an information database for storing the interactables.

17. The computer implemented system of claim 16, wherein said information database stores information of the first user and the second user.

18. The computer implemented system of claim 10, further comprising a graphical user interface for enabling the first user and the second user to access the virtual social environment.

19. The computer implemented system of claim 10, wherein said coordinates are defined by three-dimensional Cartesian coordinate values x, y and z, wherein said x and y Cartesian coordinate values define said animation path and said z Cartesian coordinate value defines said relative appearance of the interactables.

20. A computer program product comprising computer executable instructions embodied in a computer-readable medium, wherein said computer program product comprises:
a first computer parsable program code for providing a plurality of interactables in a virtual social environment;
a second computer parsable program code for enabling a first user to select one or more of said interactables;
a third computer parsable program code for modifying said selected interactables by customizing object attributes of the selected interactables,
a fourth computer parsable program code for targeting said modified interactables by the first user to one of a second user and/or said virtual social environment, and a combination thereof, comprising:
a fifth computer parasable program code for defining the relative appearance of said selected interactables and selecting or creating an animated path for each of said selected interactables defined by a plurality of coordinates;

a sixth computer parsable program code for rendering said targeted interactables to one of said second user and/or the virtual social environment, and a combination thereof;

a seventh computer parsable program code for enabling sharing of the targeted interactables with the second user in the virtual social environment; and a eighth computer parsable program code for tracking and capturing interactables usage information of the first user and the second user.

21. The method of claim 1, wherein said coordinates are defined by three-dimensional Cartesian coordinate values x, y and z, wherein said x and y Cartesian coordinate values define said animation path and said z Cartesian coordinate value defines said relative appearance of the interactables.

22. A computer implemented method of enabling a first user and a second user to interact in a virtual social environment, comprising:

providing a plurality of interactables in said virtual social environment for enabling said first user and said second user to interact in the virtual social environment, wherein said interactables comprises animations, text, sound, videos, and actions directed at one or more of sensory modalities including smell and touch;

selecting one or more of the interactables by the first user;

interacting with the second user by the first user in the virtual social environment, comprising the steps of:

selecting a target location for placing said interactables by the first user to the second user and/or the virtual social environment, wherein said step of selecting said target location further comprises;

defining relative appearance of said interactables and selecting or creating an animated path for each of said interactables, wherein said animated path and said relative appearance is defined using a plurality of coordinates;

rendering said targeted interactables to the second user and/or the virtual social environment; and sharing the targeted interactables with the second user in the virtual social environment;

whereby the virtual social environment enables the first user and the second user to interact using the interactables.

* * * * *